United States Patent
Okazaki et al.

(10) Patent No.: US 7,598,647 B2
(45) Date of Patent: Oct. 6, 2009

(54) INDUCTOR-TYPE SYNCHRONOUS MACHINE

(75) Inventors: Toru Okazaki, Osaka (JP); Shingo Ohashi, Osaka (JP); Hidehiko Sugimoto, Fukui (JP); Toshio Takeda, Tokyo (JP)

(73) Assignees: Sumitomo Electric Industries, Ltd., Osaka-shi (JP); Ishikawajima-Harima Heavy Industries Co., Ltd., Tokyo (JP)

( * ) Notice: Subject to any disclaimer, the term of this patent is extended or adjusted under 35 U.S.C. 154(b) by 155 days.

(21) Appl. No.: 11/793,818

(22) PCT Filed: Dec. 16, 2005

(86) PCT No.: PCT/JP2005/023121

§ 371 (c)(1),
(2), (4) Date: Aug. 22, 2007

(87) PCT Pub. No.: WO2006/068038

PCT Pub. Date: Jun. 29, 2006

(65) Prior Publication Data

US 2008/0100164 A1 May 1, 2008

(30) Foreign Application Priority Data

Dec. 24, 2004 (JP) ............................ 2004-374608
Nov. 29, 2005 (JP) ............................ 2005-344683

(51) Int. Cl.
*H02K 17/42* (2006.01)
(52) U.S. Cl. ...................... 310/171; 310/67 R; 310/268
(58) Field of Classification Search .................. 310/171, 310/268, 102 R, 166, 67 R
See application file for complete search history.

(56) References Cited

U.S. PATENT DOCUMENTS

| 5,767,601 A | * | 6/1998 | Uchiyama | .................... | 310/190 |
| 2003/0102756 A1 | | 6/2003 | Kusase | | |
| 2007/0046124 A1 | * | 3/2007 | Aydin et al. | ............ | 310/156.37 |

FOREIGN PATENT DOCUMENTS

| JP | 54-116610 | 9/1978 |
| JP | 03-001694 | 1/1991 |
| JP | 03-030764 | 3/1991 |
| JP | 06-086517 | 3/1994 |
| JP | 11-243672 | 9/1999 |
| JP | 2000-308317 | 11/2000 |
| JP | 2002-034222 | 1/2002 |
| JP | 2003-204661 | 7/2003 |
| RU | 2 076 434 | 3/1997 |
| RU | 2 256 580 | 7/2005 |
| SU | 1319179 | 6/1987 |
| SU | 1561160 | 4/1990 |

OTHER PUBLICATIONS

Russian Office Action Dated Jan. 13, 2009 With Translation.

* cited by examiner

*Primary Examiner*—Nguyen N Hanh
(74) *Attorney, Agent, or Firm*—Foley & Lardner LLP

(57) ABSTRACT

An inductor-type synchronous machine includes field stators having field elements by which an N-pole and an S-pole are concentrically formed, rotors to which a rotating shaft is fixed and has N-pole inductors disposed so as to face the N-pole of the field elements and S-pole inductors disposed so as to face the S-pole of the field elements, and an armature stator having armature coils disposed so as to face the N-pole inductors and the S-pole inductors.

8 Claims, 18 Drawing Sheets

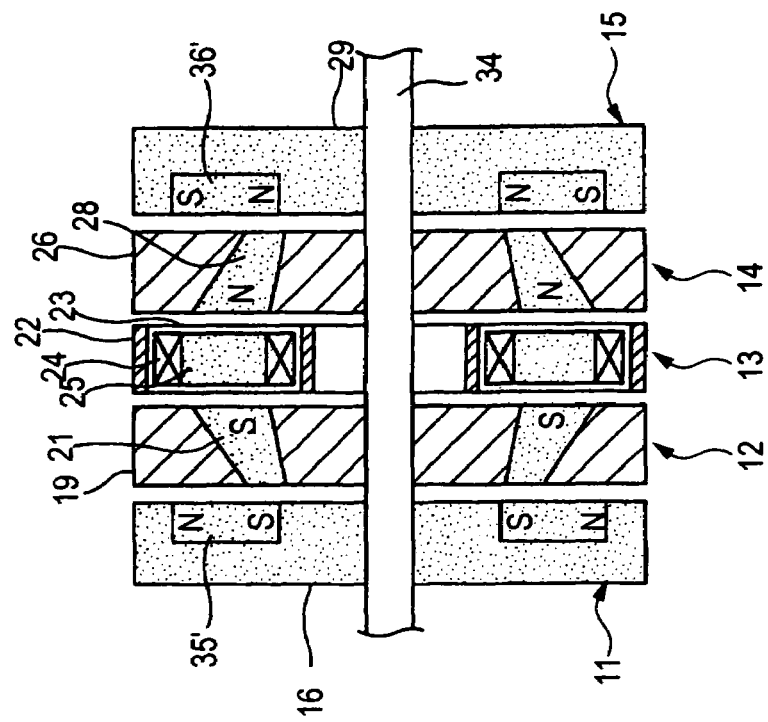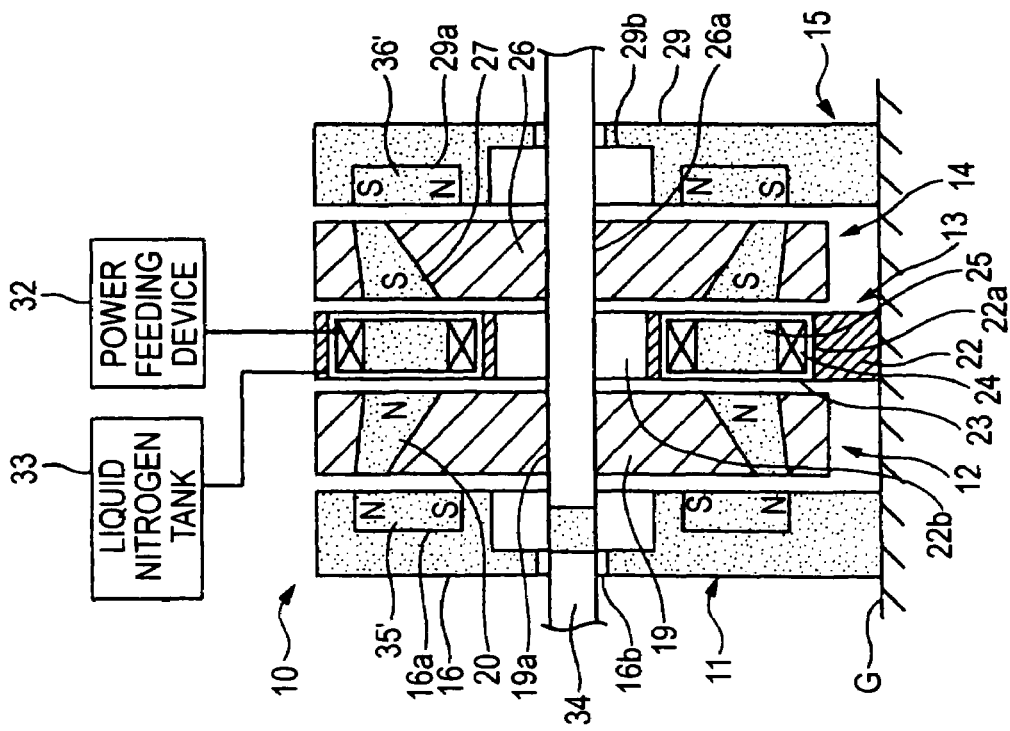

FIG. 10

PRIOR ART

INDUCTOR-TYPE SYNCHRONOUS MACHINE

TECHNICAL FIELD

The present invention relates to an inductor-type synchronous machine. More specifically, the present invention relates to a motor or a generator including a magnetic material (inductor) which induces a magnetic flux on a side of a magnetic field to a predetermined position, a rotation of a rotating shaft being synchronized with a polarity change of an armature.

BACKGROUND ART

Conventionally, in a generator disclosed in JP-A-54-116610 or JP-A-6-86517, as shown in FIG. 20, a rotating shaft 1 penetrates a bracket 2 via a bearing 3, the bracket 2 serving as an outer casing. A field winding 5 is provided on an outer periphery of a yoke 4 which is fit and fix to the rotating shaft 1, and claw-shaped magnetic poles 6 and 7 are provided so as to alternately protrude from right and left sides of the field winding 5, whereby a rotor is formed as a whole. Meanwhile, stator windings 8 are provided on the bracket 2 so as to face the claw-shaped magnetic poles 6 and 7. Electric power to the field windings 5 is supplied slidably via a slip ring 9.

According to the above configuration, when a direct current is supplied to the field winding 5 via the slip ring 9 so that an N-pole is generated on the right side of the field winding 5 as viewed in the figure and an S-pole is generated on the left side of the field windings 5 as viewed in the figure, an N-pole is induced on the claw-shaped magnetic pole 6 protruding from the right side while an S-pole is induced on the claw-shaped magnetic pole 7 protruding from the left side. Thus, a plurality of N-poles and a plurality of S-poles can be generated alternately on an outer circumferential side of the rotor along a circumferential direction thereof.

However, the field winding 5 is formed as a part of the rotor, and an electric power supply to the field winding 5 which moves rotationally needs to be performed via the slip ring 9 by a sliding-contact. Thus, a structure becomes complex. Also, there are problems such as a reduction of life due to a contact wear at the slip ring 9, and a destabilization of a power supply due to a destabilization of the sliding-contact at the slip ring 9.

Patent Document 1: JP-A-54-116610
Patent Document 2: JP-A-6-86517

DISCLOSURE OF THE INVENTION

Problems to Be Solved By the Invention

The present invention has been made in view of the above problems, and it is an object thereof to enable a simple structure for an electric power supply to a coil.

Means for Solving the Problems

In order to solve the problems, the present invention provides an inductor-type synchronous machine comprising:
a field stator having a field element by which an N-pole and an S-pole are concentrically formed;
a rotor having an N-pole inductor which is formed of a magnetic material and is disposed so as to face the N-pole of the field element, and an S-pole inductor which is formed of a magnetic material and is disposed so as to face the S-pole of the field element, wherein a rotating shaft is fixed to the rotor; and
an armature stator having an armature coil which is disposed so as to face the N-pole inductor and the S-pole inductor.

According to the above configuration, since both the field element and the armature coil are attached to the respective stators, a sliding-contact member such as a slip ring becomes unnecessary to feed electric power to the coil. Therefore, the structure can be simplified, and the problems such as a reduction of life due to a contact wear at the slip ring and a destabilization of a power supply can be solved.

When the rotor rotates, the N-pole inductor moves along a circumference at an N-pole generation position of the field stator, while the S-pole inductor moves along a circumference at an S-pole generation position of the field stator. Thus, a certain polarity is induced to each of the inductors. The field stator and the armature stator may be either separated from each other or integrated with each other.

In a case where the synchronous machine is a motor, a power feeding is performed by periodically changing the polarity of the armature coil. Thus, an attracting force/a repulsion force are generated between the armature coil and the N-pole and S-pole inductors, so that the rotor rotates and a driving force of the rotating shaft is generated. In a case where the synchronous machine as a generator, the N-pole inductor and the S-pole inductor rotate around an axis by a rotational movement of the rotating shaft, so that an induced current flows in the armature coil.

The field element may be a field coil that is wound around an axis of the rotating shaft, and a part of the N-pole inductor may be disposed so as to face one of an outer circumferential side and an inner circumferential side of the field coil while a part of the S-inductor is disposed so as to face the other.

According to the above configuration, when a direct current is supplied to the field coil, the N-pole is generated on one of the outer circumferential side and the inner circumferential side of the field coil while S-pole is generated on the other, so that the N-poles and the S-pole can be concentrically. Consequently, the N-pole inductor and the S-pole inductor can be caused to generate a multiple-pole magnetic field with a single field coil. Accordingly, a coil winding work can be simplified, whereby the manufacturing efficiency can be enhanced.

Alternatively, the field element may be a permanent magnet disposed around the axis of the rotating shaft, and a part of the N-pole inductor may disposed so as to face an N-pole side of the permanent magnet while a part of the S-pole inductor is disposed so as to face an S-pole side of the permanent magnet.

According to the above configuration, it is the permanent magnet that is disposed to the field stator. Therefore, the manufacturing efficiency of the inductor-type synchronous machine is enhanced, and the structure can be simplified.

Also, in a case where the inductor-type synchronous machine according to the present invention is an inductor-type motor, even when the permanent magnet is used as the field element, the inductor-type motor can sufficiently deal with output power ranging from 1 kW to 5 MW, so that the inductor-type synchronous machine can be downsized.

At least one of the field element and the armature coil is formed of a superconducting material.

A magnetic permeability of a magnetic material constituting each of the inductors is usually larger than that of air by three digits or more. Thus, a magnetic flux generated by the field element mainly passes through the inductors. However, because a predetermined air gap is provided between the field element and each of the inductors or between the armature coil and the inductors, there is a case where magnetic resistance increases so that a leakage of magnetic flux occurs in which the magnetic flux deviates toward an unexpected direction, and an amount of magnetic flux contributing to the output is thus reduced.

When either one or both of the field element and the armature coil is formed of a superconducting material, a large current can be fed without fear of heat generation, and the magnetic flux to be generated can be considerably enhanced. Accordingly, even when the leakage of the magnetic flux occurs, the magnetic flux contributing to the output can be increased to obtain high power output since the total magnetic flux generated is increased. Also, a large current density can be obtained by superconductization. Therefore, the field element and the armature coil can be downsized so that the synchronous machine can be reduced in size and weight. As a superconducting material, bismuth-based or yttrium-based high-temperature superconducting materials can be suitably used.

Also, considering a case where a superconducting material cooling structure is provided to exert predetermined superconducting performance, since both the field element and each of the armature coils are attached to the stator and are do not move therefrom, it becomes easier to design a refrigerant supply path or a sealing structure, and the cooling structure can be simplified.

A cross-section area of each of the N-pole inductor and the S-pole inductor may be constant from one end to the other end.

Namely, according to the above configuration, a magnetic flux which is generated by the field element and is introduced to each of the inductors becomes less likely to saturate within the inductors. Thus, a magnetic flux can efficiently be introduced to the armature coil.

Also, the cross-section area of the N-pole inductor and the cross-section area of the S-pole inductor may be substantially equal.

Namely, since the cross-sections of the inductors are uniformized, the attraction force/the repulsion force generated between the inductors and the armature coil becomes constant, whereby a rotation balance of the rotor can be stabilized.

A specific structure of the synchronous machine may be an axial-gap structure in which the field stator is disposed so as to face one side of the rotor in an axial direction of the rotor with a predetermined gap therebetween, and the armature stator is disposed so as to face the other side of the rotor in the axial direction of the rotor with a predetermined gap therebetween, the rotating shaft fixed to the rotor is rotatably passed through and bridged between the field stator and the armature stator, and a direction of a magnetic flux of each of the field element and the armature coils is directed to the axial direction.

Alternatively, it may be a radial-gap structure, in which one of the field stator and the armature stator is an outer circumferential tube, and the rotor is disposed inside the outer circumferential tube with a predetermined gap therebetween.

ADVANTAGES OF THE INVENTION

As is apparent from the foregoing description, according to the present invention, both of the field element and the armature coil are attached to the stator. Therefore, a sliding-contact member such as a slip ring is unnecessary to feed electric power to the coil. Thus, simplification of the structure, lengthening of a life duration and stabilization of power feeding can be achieved.

Also, when one or both of the field element (the field coil) and the armature coil is formed of a superconducting material, a large current can be fed without fear of heat generation, whereby the magnetic flux can be considerably enhanced.

Consequently, even in a case where a leakage of magnetic flux occurs, the magnetic flux contributing to an output can be increased, thereby enabling a high power output.

In a case where the cross-section area of each of the N-pole inductor and the S-pole inductor is constant from one end to the other end, the magnetic flux is less likely to saturate inside the inductors so that the magnetic flux can be efficiently induced to a side of the armature coil. Further, in a case where the cross-section area of the N-pole inductor and the cross-section area of the S-pole inductor are substantially equal, the attraction force/the repulsion force generated between the inductors and the armature coil is constant, so that the rotation balance of the rotor can be stabilized.

BRIEF DESCRIPTION OF THE DRAWINGS

FIG. 9(A) is a sectional view of an inductor-type synchronous motor according to a second modified example of the first embodiment of the invention, and FIG. 9(B) is a sectional view of the inductor-type synchronous motor seen from a position turned by 90°.

FIG. 10 is a sectional view of an inductor-type synchronous motor according to a second embodiment.

Figure 1A:
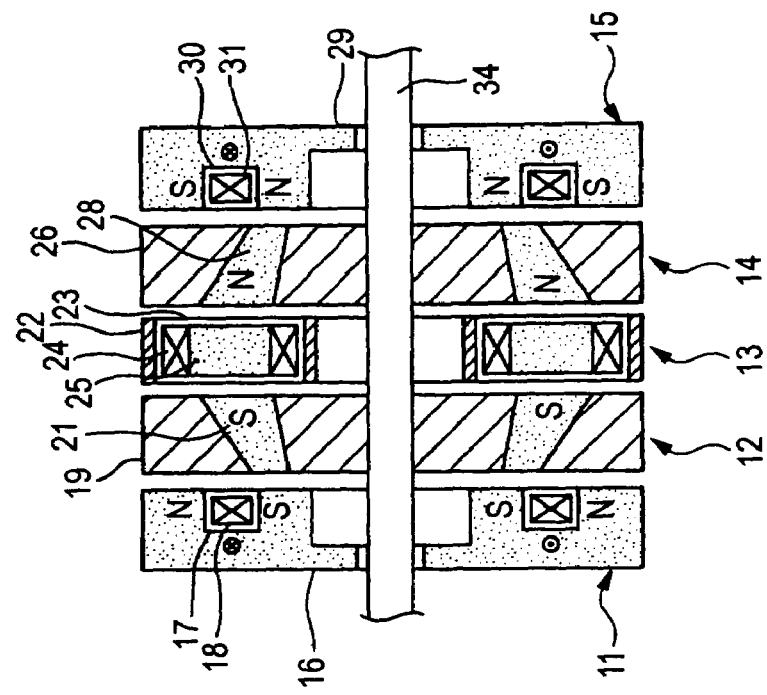
FIG. 1(A) is a sectional view of an inductor-type synchronous motor according to a first embodiment of the invention.

DESCRIPTION OF REFERENCE NUMERALS AND SIGNS 10, 40, 50, 70 inductor-type synchronous motor
11, 15, 51, 72, 92 field stator
12, 14, 41, 44, 60, 73, 91 rotor
13, 71 armature stator
17, 23, 30, 76, 79 vacuum insulation containers
18, 31, 78, 93 field coil
20, 28, 62, 81, 98 N-pole inductor
21, 27, 63, 82, 97 S-pole inductor
24, 75 armature coil
34, 101 rotating shaft
35, 36, 35', 36', 37, 38, 37', 38' permanent magnet
95 fixed shaft
99, 100 support portion

BEST MODE FOR CARRYING OUT THE INVENTION

Embodiments of the invention will be described with reference to the drawings.

FIG. 1 shows an inductor-type synchronous motor (a inductor-type synchronous machine) 10 according to a first embodiment.

The inductor-type synchronous motor 10 has an axial gap structure in which a rotating shaft 34 penetrates a field stator 11, a rotor 12, an armature stator 13, a rotor 14, and a field stator 15 in this order. The field stators 11, 15 and the armature stator 13 are fixed to an installation surface G with a gap being provided with respect to the rotating shaft 34, and the rotors 12, 14 are fit and fixed to the rotating shaft 34 by providing an air gap from the rotating shaft 34 thereto.

Figure 3:
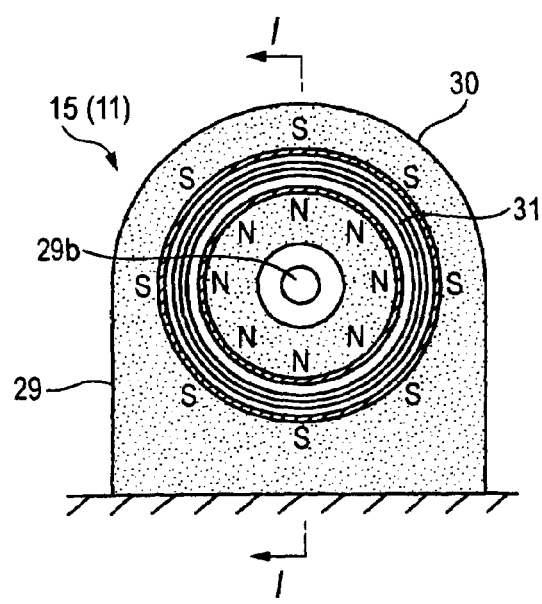
FIG. 3(A) is a front view of a field stator.
FIG. 3(B) is a sectional view taken along line I-I shown in FIG. 3(A).
Figure 3:
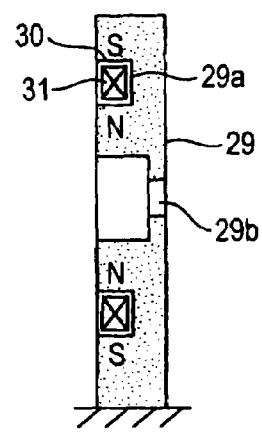

The field stator 11 and the field stator 15 are bilaterally symmetric with respect to reflection. Therefore, one of the stators 15 is representatively shown in FIGS. 3(A) and 3(B).

Each of the field stators 11, 15 has a yoke 16, 29 made of a magnetic material and is fixed to the installation surface G, an heat-insulating refrigerant container 17, 30 having a vacuum insulation structure embedded inside the respective yokes 16, 29, and a field coil 18, 31 which is a winding made of a superconducting material, and is accommodated inside the respective heat-insulating refrigerant container 17, 30.

Each of the yokes 16, 29 has a loose-fining hole 16b, 29b which is drilled at a center part thereof to have a diameter larger than an outer diameter of the rotating shaft 34, and an a groove portion 16a, 29a which is concavely provided in an annular shape around the loose-fitting hole 16b, 29b. Each of the field coils 18, 31 is accommodated in the respective heat-insulating refrigerant containers 17, 30 inside which liquid nitrogen is circulated. Each of the heat-insulating refrigerant containers 17, 30 is embedded in the respective groove portions 16a, 29a.

The yokes 16, 29 are made of a magnetic material such as permendur, a silicon steel plate, iron, and permalloy. As a superconducting material for forming the field coils 18, 31, bismuth-based or yttrium-based high-temperature superconducting materials are used.

Figure 2:
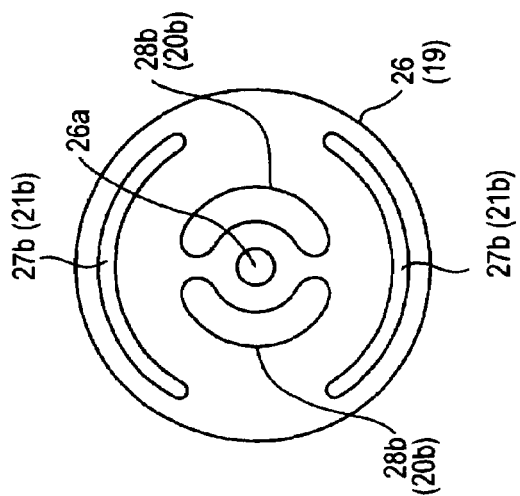
FIG. 2(A) is a front view of a rotor.
FIG. 2(B) is a sectional view taken along line I-I shown in FIG. 2(A)
FIG. 2(C) is a rear view of the rotor, and FIG. 2 (D) is a sectional view taken along line II-II shown in FIG. 2(A).
Figure 2:
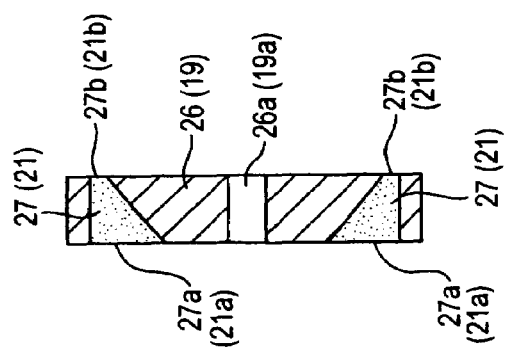
Figure 2:
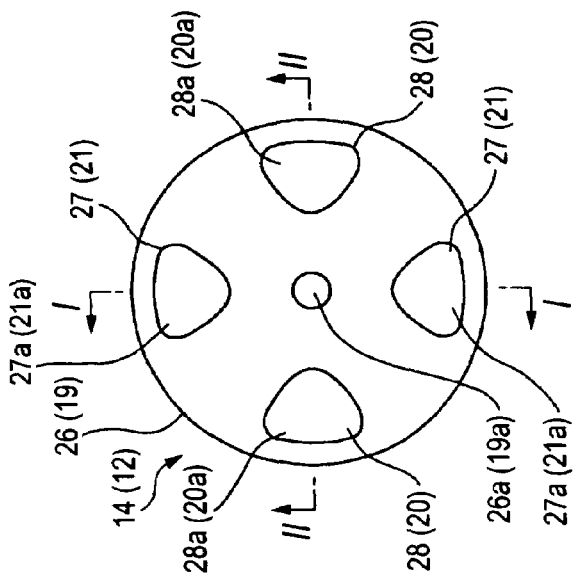
Figure 2:
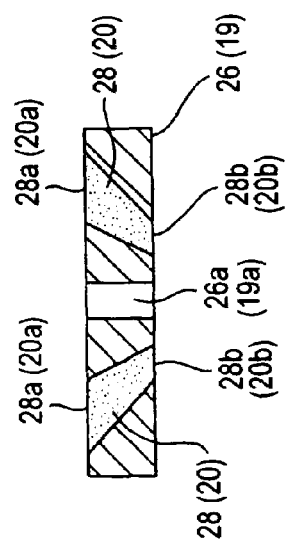

The rotors 12, 14 are bilaterally symmetric. Thus, one of the rotors 14 is representatively shown in FIGS. 2 (A) to 2 (D) Each of the rotors 12, 14 includes a disk-shaped support portion 19, 26, which is made of a non-magnetic material and has a rotating shaft mounting hole 19a, 26a, a pair of S-pole inductors 21, 27 embedded at point-symmetrical positions around the rotating shaft mounting hole 19a, 26a, and a pair of N-pole inductors 20, 28 embedded at positions turned by 900 from the positions of the respective S-pole inductors 21, 27.

The S-pole inductors 21, 27 and the N-pole inductors 20, 28 are configured such that respective sector-shaped end surfaces 20a, 21a, 27a, 28a facing the armature stator 13 are arranged at a regular intervals along a concentric circle, and such that areas of the end surfaces 20a, 21a, 27a, 28a are equal to one another.

Figure 4:
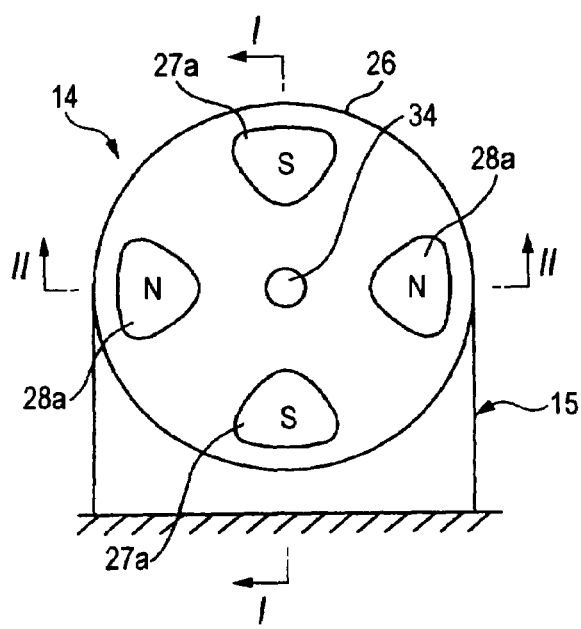
FIG. 4(A) is a front view showing a state in which the rotor and the field stator are penetrated by a rotating shaft.
FIG. 4(B) is a sectional view taken along line I-I shown in FIG. 4(A), and FIG. 4 (C) is a sectional view taken along line II-II shown in FIG. 4(A).
Figure 4:
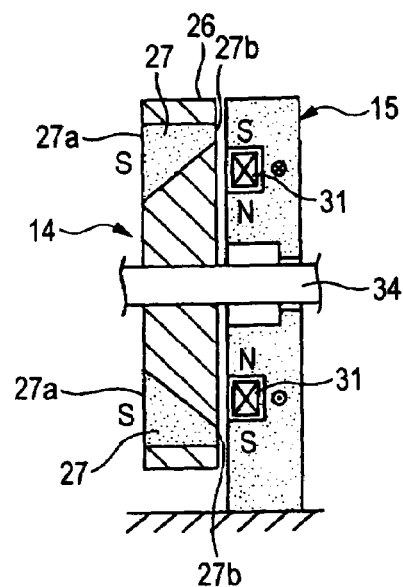
Figure 4:
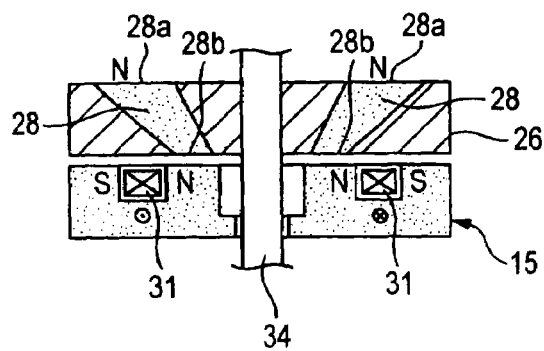

The other end surfaces 21b, 27b of the S-pole inductors 21, 27 are disposed so as to face S-pole generation positions of the field coils 18, 31. For example, as shown in FIGS. 2(C) and 4(B), the other end surface 27b of the S-pole inductor 27 has a circular-arc shape and is disposed so as to face the outer circumferential side of the field coil 31.

The other end surfaces 20b, 28b of the N-pole inductors 20, 28 are disposed so as to face N-pole generation positions of the field coils 18, 31. For example, as shown in FIGS. 2(C) and 4(C), the other end surface 27b of the S-pole inductor 27 has a circular-arc shape and is disposed so as to face the inner circumferential side of the field coil 31.

Namely, each of the S-pole inductors 21, 27 and the N-pole inductors 20, 28 has a three-dimensional shape in which a cross-sectional shape thereof changes along an axial direction from a circular-arc shape on the other end surfaces 20b, 21b, 27b, 28b to a sector shape on the end surfaces 20a, 21a, 27a, 28a. A cross-section area of each of the S-pole inductors 21, 27 and the N-pole inductors 20, 28 is constant from the other end surfaces 20b, 21b, 25b, 28b to the end surfaces 20a, 21a, 25a, 28a. Also, each of the other end surfaces 20b, 28b of the S-pole inductors 20, 28 as the same area as each of the other end surfaces 21b, 27b of the N-pole inductors 21, 27.

The support portion 26 is formed of a non-magnetic material such as an FRP and stainless steel. The inductors 27, 28 are formed of magnetic materials such as permendur, a silicon steel plate, iron, and permalloy.

Figure 1B:
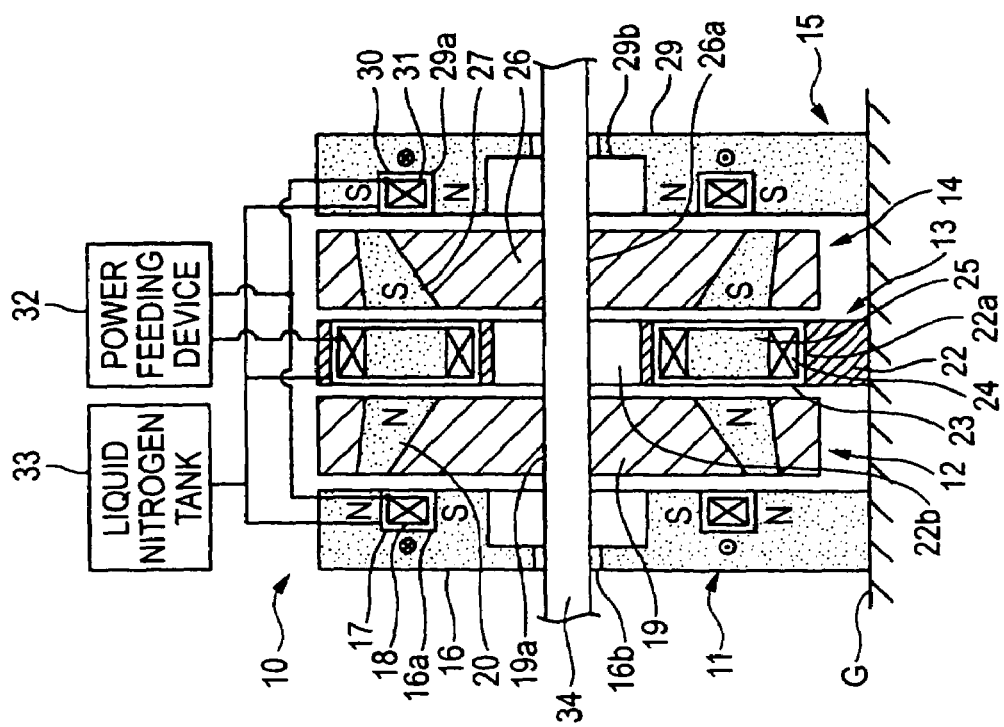
FIG. 1(B) is another sectional view of the inductor-type synchronous motor seen from a position turned by 90°.

As shown in FIGS. 1(A) and 1(B), the armature stator 13 includes a support portion 22 which is formed of a non-magnetic material and is fixed to the installation surface G, a heat-insulating refrigerant container 23 which has a vacuum insulation structure and is embedded in the support portion 22, and armature coils 24 each of which is a winding made of a superconducting material and is accommodated in the heat-insulating refrigerant container 23.

The support portion 22 has a loose-fitting hole 22b which is drilled at a center part thereof to have a diameter larger than the outer diameter of the rotating shaft 34, and four mounting holes 22a which are drilled and arranged at a regular intervals along a circumferential direction around the loose-fitting hole 22b. Each of the armature coils 24 is accommodated in the heat-insulating refrigerant container 23 in which liquid nitrogen is circulated, and a flux collector 25 formed of a magnetic body is disposed in a hollow portion of each of the armature coils 24. The four heat-insulating refrigerant containers 23 respectively accommodating the armature coils 24 are embedded in the coil mounting holes 22a.

The flux collector 25 is formed of a magnetic material such as permendur, a silicon steel plate, iron, and permalloy. As a superconducting material which forms the armature coils 24, bismuth-based or yttrium-based high-temperature superconducting material is used. The support portion 22 is formed of a non-magnetic material such as FRP and stainless steel.

A power feeding device 32 is connected to the field coils 18, 31 and the armature coils 24 through wirings, and supplies a direct current to the field coils 18, 31, while supplying a three-phase alternating current to the armature coils 24.

A liquid nitrogen tank 33 is connected to the heat-insulating refrigerant containers 17, 23, 30 through a heat-insulation piping, and the liquid nitrogen is circulated as a refrigerant.

Next, a principle of an operation of the inductor-type synchronous motor 10 will be described.

When the direct current is supplied to the field coil 31 on a right side in FIG. 1, an S-pole is generated on the outer circumferential side of the field coil 31 while an N-pole is generated on the inner circumferential side thereof. Then, as shown in FIGS. 4(A) and 4(B), a magnetic flux on a side of the S-pole is introduced into the S-pole inductor 27 from the other end surface 27*b* so that an S-pole magnetic flux appears on the end surface 27*a*. Further, as shown in FIGS. 4(A) and 4(C), a magnetic flux on a side of the N-pole is introduced into the N-pole inductor 28 from the other end surface 28*b* so that an N-pole magnetic flux appears on the end surface 28*a*. Because the other end surfaces 27*b*, 28*b* are concentrically arranged along the outer and inner circumferential of the field coil 31 respectively, the S-pole magnetic flux always appears on the end surface 27*a* of the S-pole inductor while the N-pole always appears on the end surface 28*a* of the N-pole inductor 28.

Based on a similar principle, when a direct current is supplied to the field coil 18 on a left side in FIG. 1, an N-pole always appears on the end surface 20*a* of the N-pole inductor 20 of the rotor 12, while an S-pole always appears on the end surface 21*a* of the S-pole inductor 21.

When the three-phase alternating current is supplied to the armature coils 24 in this state, a rotating magnetic field is generated around an axis of the armature stator 13 due to a power feeding phase shift among three phases. In consequence of the rotating magnetic field, torque is generated around the axis each of the N-pole inductors 20, 28 and the S-pole inductors 21, 27 of the rotors 12, 14, whereby the rotors 12, 14 rotate to rotationally drive the rotating shaft 34.

According to the above configuration, the field stators 11, 15 to which the field coils 18, 31 are respectively attached, and the armature stator to which the armature coils 24*a* reattached do not rotate, while the rotors 12, 14 to which the inductors 20, 21, 27, 28 are respectively attached rotate together with the rotating shaft 34. Therefore, a sliding-contact member such as a slip ring becomes unnecessary for feeding electric power to the respective coils 18, 31, whereby simplification of the power feeding structure and stabilization of power feeding can be achieved, and contributes to longer life duration of the motor. Further, the heat-insulating refrigerant containers 17, 23, 30, to which liquid nitrogen is supplied from the liquid nitrogen tank 33, are fixed and do not move while the motor is in operation. Thus, a designing of a refrigerant supply path and a sealing structure becomes easier so that simplification of the cooling structure can be achieved.

Further, since the field coils 18, 31 and the armature coils 24 are formed of superconducting materials, a large current can be supplied to drastically enhance the magnetic flux. Accordingly, an amount of magnetic flux contributing to the output can be increased even when a leakage of the magnetic flux occurs so that the magnetic flux deviates in an unexpected direction. Thus, high power output can be realized.

Further, since the cross-section area of each of the N-pole inductors 20, 28 and the S-pole inductors 21, 27 is set to be constant from the other end surfaces 20*b*, 21*b*, 27*b*, 28*b* to the end surfaces 20*a*, 21*a*, 27*a*, 28*a*, saturation of the magnetic flux within the inductors 20, 21, 27, 28 is suppressed, whereby the magnetic flux can efficiently be induced toward each of the armature coils 24.

Also, since the cross-section area of each of the N-pole inductors 20, 28 and the cross-section area of each of the S-pole inductors 21, 27 are substantially equal, an attraction force/a repulsion force generated between the armature coils 24 and the inductors is constant, whereby rotation balance of the rotors 12, 14 can be stabilized.

Either the field coils 18, 31 or the armature coils 24 may be formed of a normal conduction material such as a copper wire. In such a case, it is possible to omit a cooling structure for the normal conduction wire. Further, although the embodiment is directed to a motor, the same structure can be utilized in a generator.

FIGS. 5 to 9 show modified examples of the first embodiment. This modified examples differ from the first embodiment in that the field element is a permanent magnet.

Figure 5:
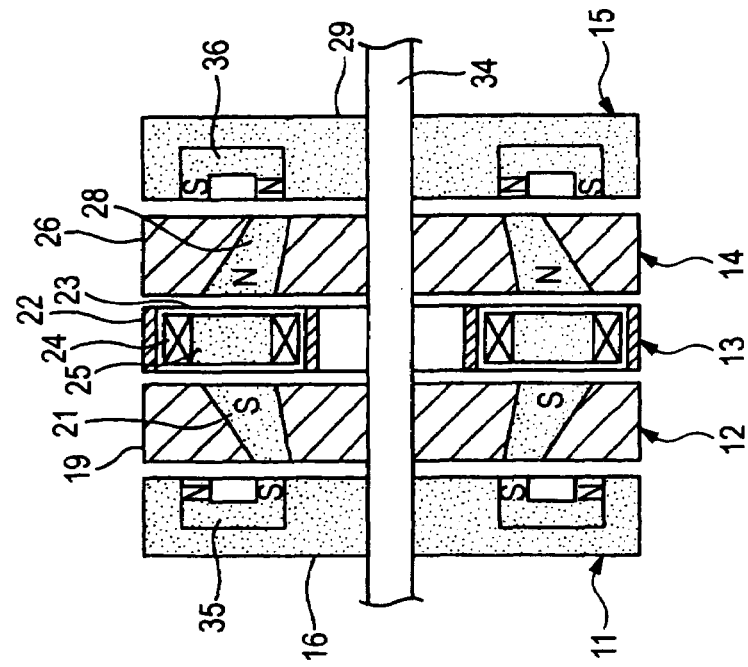
FIG. 5(A) is a sectional view of an inductor-type synchronous motor according to a first modified example of the first embodiment of the invention.
FIG. 5(B) is a sectional view of the inductor-type synchronous motor seen from a position turned by 90°.
Figure 5:
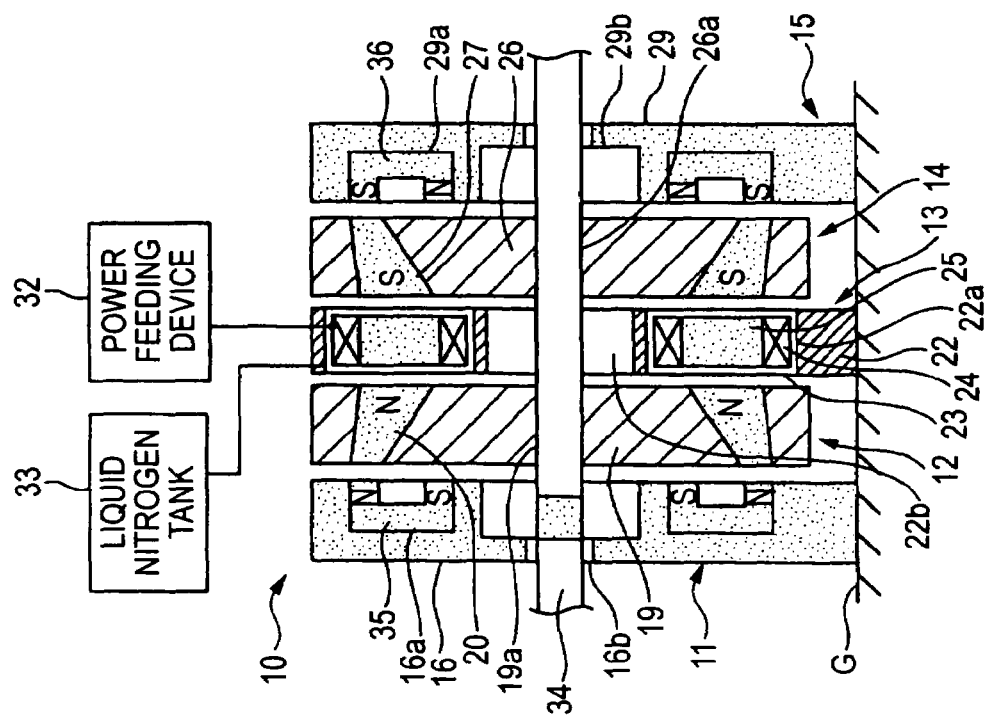
Figure 6:
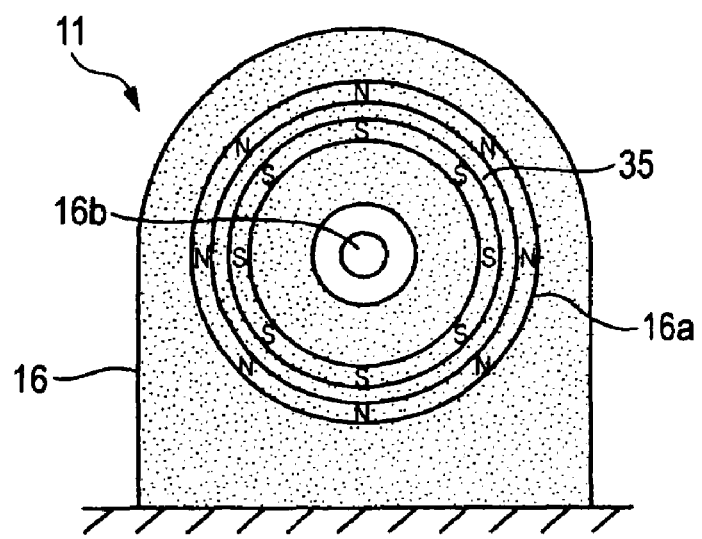
FIGS. 6(A) and 6(B) are front views of respective field stators according to the first modified example.
Figure 6:
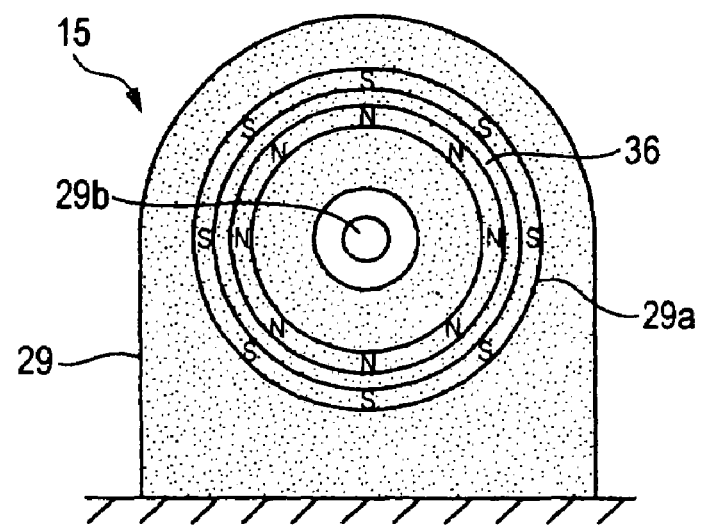

In the first modified example shown in FIGS. 5 and 6, permanent magnets 35, 36, each having an annular shape and a cross-section of a U-shape in a radial direction, are attached to the respective yokes 16, 29 of the field stators 11, 15 such that N-pole and S-pole are concentrically disposed.

Specifically, the permanent magnet 35 having an S-pole on an inner circumferential side and an N-pole on an outer circumferential side is attached in the annular groove portion 16*a* which is concavely provided on the yoke 16 of the field stator 11 (on the left side in FIG. 5) around the loose-fitting hole 16*b*.

On the other hand, the permanent magnet 36 having an S-pole on an inner circumferential side and an N-pole on an outer circumferential side is attached in the annular groove portion 29*a* which is concavely provided on the yoke 29 of the field stator 15 (on the right side in FIG. 5) around the loose-fitting hole 29*b*.

Figure 7:
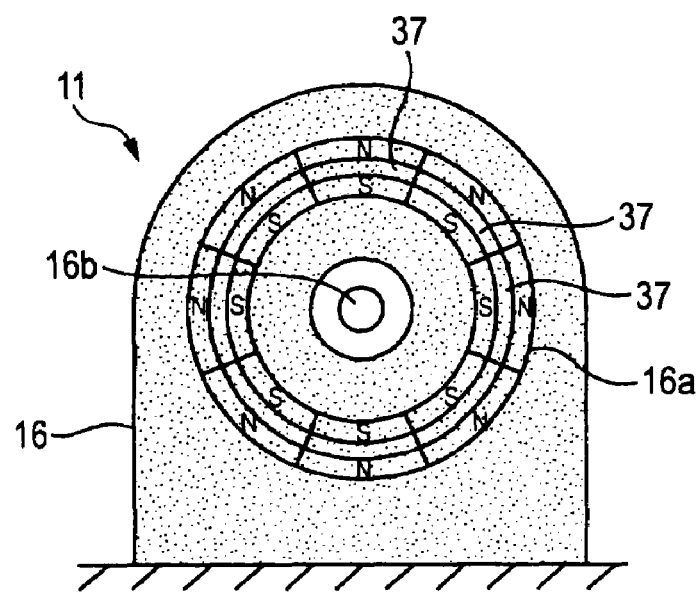
FIGS. 7(A) and 7(B) are front views of respective field stators according to a second modified example.
Figure 7:
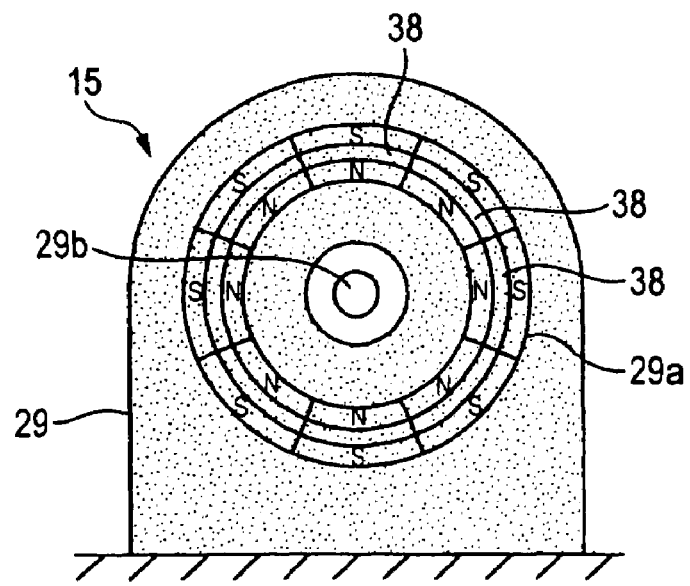

In a second modified example shown in FIG. 7, a plurality of permanent magnets 37, 38 divided into sector shapes are disposed in the groove portions 16*a*, 29*a* provided in the yokes 16, 29 of the field stators 11, 15 along the circumferential directions thereof without a space between adjacent magnets, thereby providing a shape that is the same as that of the permanent magnet of the first modified example.

Figure 8:
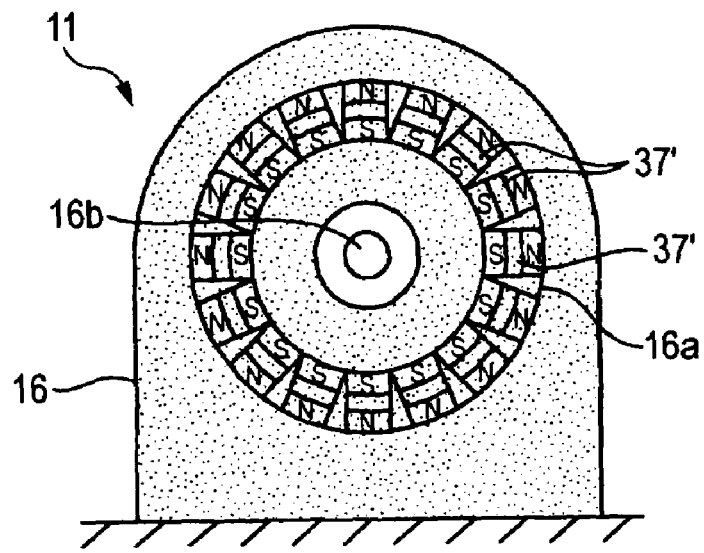
FIGS. 8(A) and 8(B) are front views of respective field stators according to a third modified example.
Figure 8:
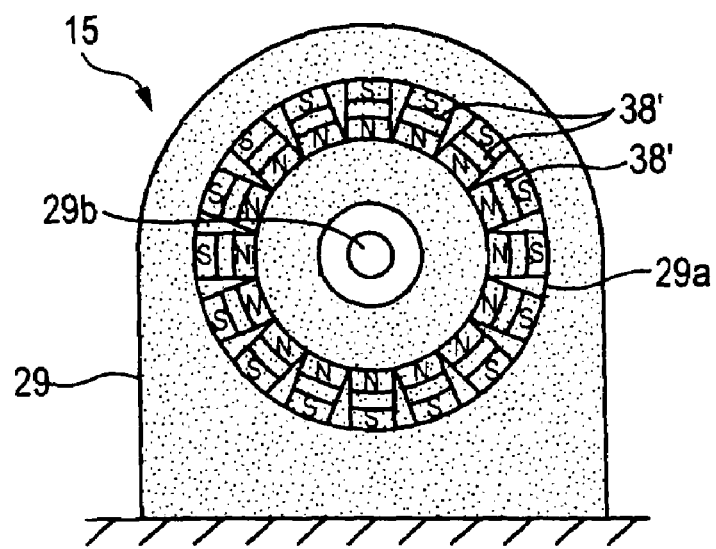

In a third modified example shown in FIG. 8, a plurality of divided permanent magnets 37', 38' are disposed in the groove portions 16*a*, 29*a* provided in the yokes 16, 29 of the field stators 11, 15 along the circumferential directions thereof, similarly to the second modified example. However, instead of being divided into sector shapes, the permanent magnets 37', 38' are formed such that the width on the outer circumferential side is equal to the width of the inner circumferential side. Thus, although the permanent magnets 37', 38' are disposed without space between the adjacent magnets on the inner circumferential side, a space is provided between the adjacent permanent magnets 37', 38' on the outer circumferential side.

In a fourth modified example shown in FIG. 9, the shape of the cross section in a radial direction of each of the annular permanent magnets 35', 36' is formed in a rectangular shape which differs from the first to third modified examples.

Similarly to the first modified example, the permanent magnet 35' is attached to the annular groove portion 16*a* which is concavely provided around the loose-fitting hole 16*b* such that an S-poles is on the inner circumferential side and an N-pole is on the outer circumferential side. On the other hand, the permanent magnet 36' is attached to the annular groove portion 29*a* which concavely provided around the loose-fitting hole 29*b* such that an S-pole is on the outer circumferential side and an N-pole is on the inner circumferential side.

The permanent magnets divided in the circumferential direction may also be used in this modified example, similarly to the second and third modified examples.

In the inductor-type synchronous motor having the above configuration, a magnetic flux on a side of the S-pole of the permanent magnet is introduced inside the S-pole inductors 21, 27 so that the S-pole magnet flux appears on the end surfaces 21*a*, 27*a* of the S-pole inductors 21, 27. Also, a magnetic flux on a side of the N-pole of the permanent magnet is introduced inside the N-pole inductors 20, 28 so that the N-pole magnetic flux appears on the end surfaces 20*a*, 28*a* of the N-pole inductors 20, 28.

When a three-phase alternating current is supplied to the armature coils 24 in this state, a rotating magnetic field is generated around the axis the armature stator 13 due to a power feeding phase shift among three phases. The rotating magnetic field generates the torque around the axis each of the N-pole inductors 20, 28 and the S-pole inductors 21, 27 of the rotors 12, 14, whereby the rotors 12, 14 rotate to rotationally drive the rotating shaft 34.

According to the above configuration, since the permanent magnets are disposed at the field stators 11, 15, the manufacturing efficiency of the inductor-type synchronous motor is enhanced. In addition, the power feeding device and the cooling structure for the field element become unnecessary so that the structure can be simplified.

Also, is an output power is from 1 kW to 5 MW, it is sufficient that the permanent magnets are used as the field elements. Thus, the downsizing of the inductor-type synchronous machine can be achieved as compared with a case where a super conducting material is used is the field elements as in the first embodiment.

Similarly to the present embodiment, a permanent magnet can also be used as the field element in the following embodiments.

Figure 10:
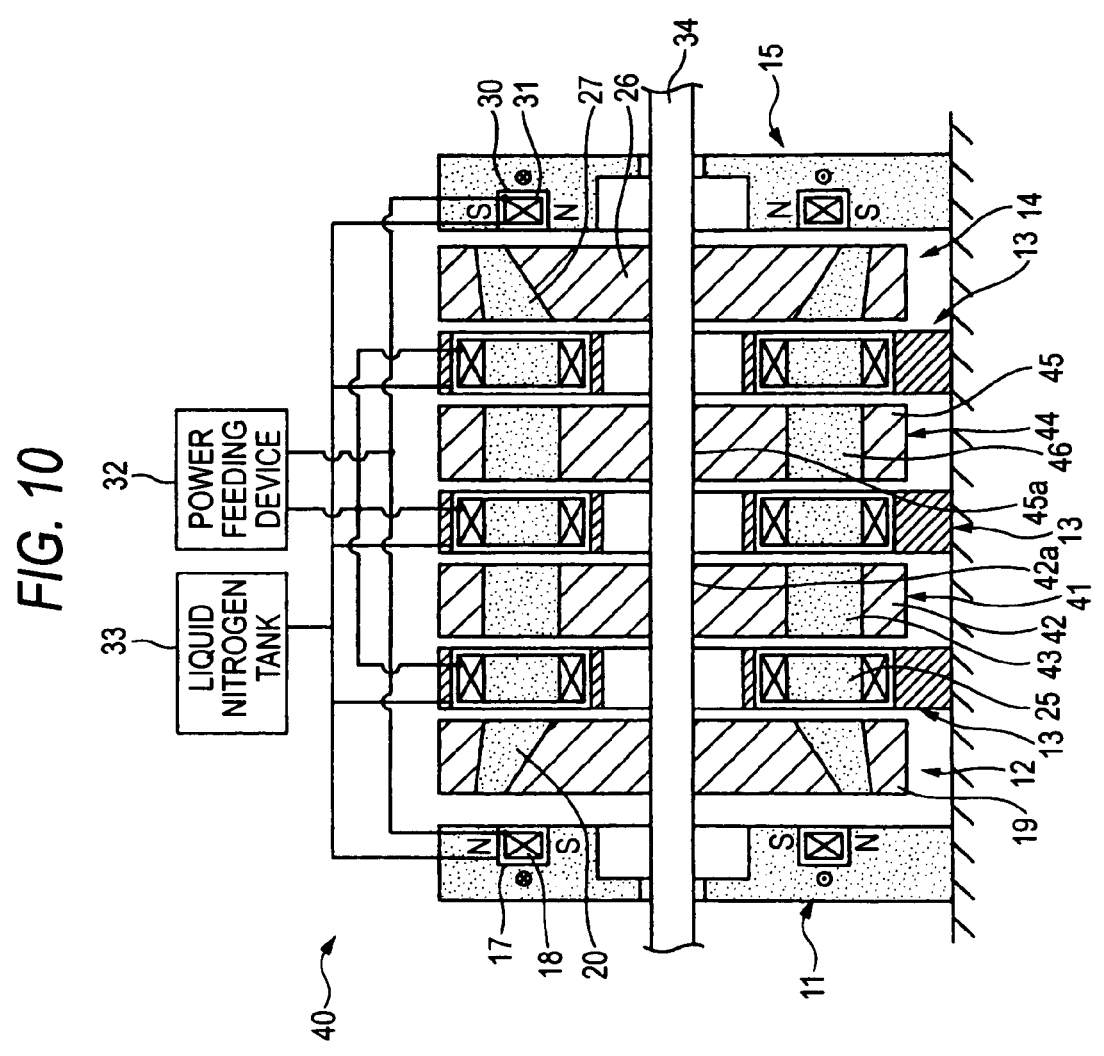

FIG. 10 shows a second embodiment.

The second embodiment differs from the first embodiment in that the number of rotors 41, 44 and armature stators 13 is increased.

More specifically, the rotor 41, the armature stator 13, the rotor 44, and the armature stator 13 are added between the armature stator 13 and the rotor 14 of the first embodiment.

Each of the rotors 41, 44 includes a disk-shaped support portion 42, 45 which is made of a non-magnetic material and is formed with a rotating shaft mounting hole 42*a*, 45*a* for the rotating shaft 34, and a inductor 43, 46 having four magnetic members respectively embedded at a regular intervals along the circumferential direction around the rotating shaft mounting hole 42*a*, 45*a*. Each of the inductors 43, 46 has a section, the shape of which is the same as that of the section of the flux collector 25 of the armature stator 13. The support portions 42, 45 are formed of a non-magnetic material such as FRP and stainless steel. The inductors 43, 46 are made of a magnetic material such as permendur, a silicon steel plate, iron, and permalloy.

In the above configuration, the field coils 18, 31 are formed of a superconducting material so that a magnetic flux can be considerably enhanced so as to reach more distant positions. Therefore, many rotors 12, 41, 44 can be disposed between the field stators 11, 15 on respective sides, and output torque can be enhanced.

Since the other configurations of the second embodiment are similar to those of the first embodiment, the same reference numerals are attached and the description thereof is omitted.

Figure 11:
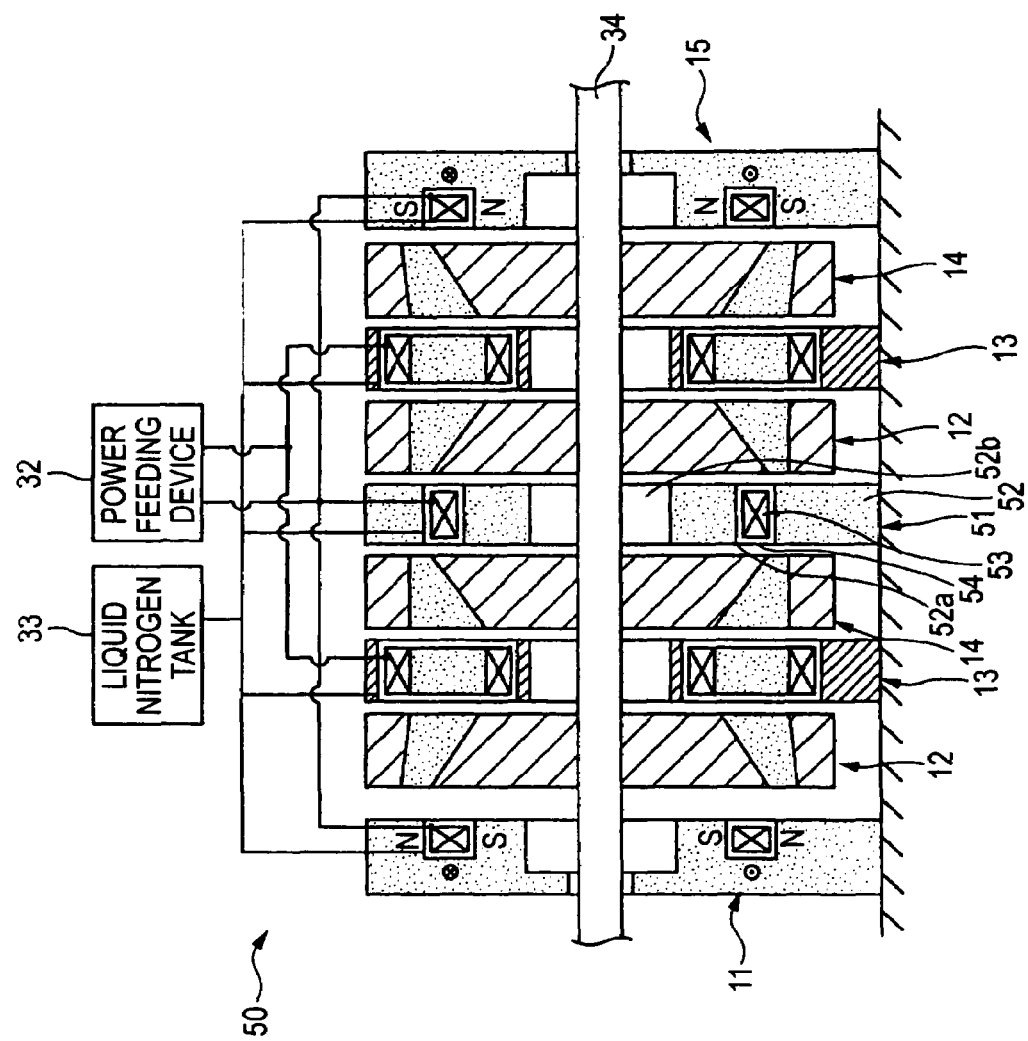
FIG. 11 is a sectional view of an inductor-type synchronous motor according to a third embodiment.

FIG. 11 shows a third embodiment.

The third embodiment differs from the first embodiment in that the rotors 12, 14, the armature stator 13, and the field stator 51 are increased.

More specifically, the field stator 51, the rotor 12, the armature stator 13, and the rotor 14 are added to between the rotor 14 and the field stator 15 of the first embodiment.

The field stator 51 includes a yoke 52 which is formed of a magnetic material and is fixed to the installation surface G, an heat-insulating refrigerant container 5.4 having a vacuum insulation structure embedded in the yoke 52, and a field coil 53 which is a winding made of a superconducting member and is accommodated in the heat-insulating refrigerant container 54.

The yoke 52 has a loose-fitting hole 52*b* which is drilled at a center thereof such that an outer diameter thereof is larger than the outer diameter of the rotating shaft 34, and a mounting hole 52*a* drilled in an annular shape around the loose-fitting hole 52*b*. The field coil 53 is accommodated in the annular heat-insulating refrigerant container 54 inside which the liquid nitrogen is circulated. The heat-insulating refrigerant container 54 is embedded in the mounting hole 52*a*.

Since the configurations of the third embodiment are similar to those of the first embodiment, the same reference numerals are attached and the description thereof is omitted.

Figure 12:
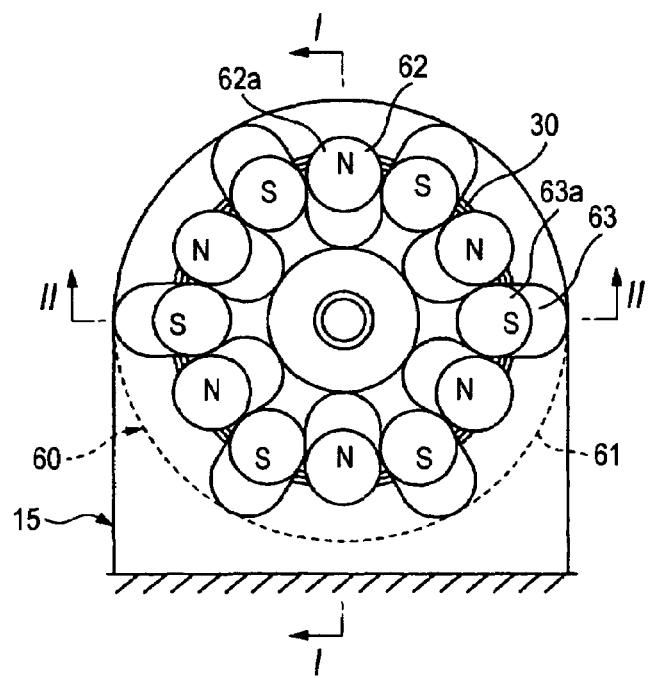
FIG. 12(A) is a front view showing a state in which a rotor and a field stator according to a fourth embodiment are penetrated by a rotating shaft, FIG. 12 (B) is a sectional view taken along line I-I shown in FIG. 4 (A)
FIG. 12(C) is a sectional view taken along line II-II shown in FIG. 12(A).
Figure 12:
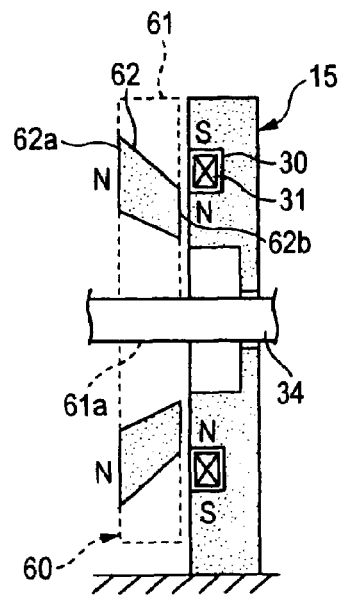
Figure 12:
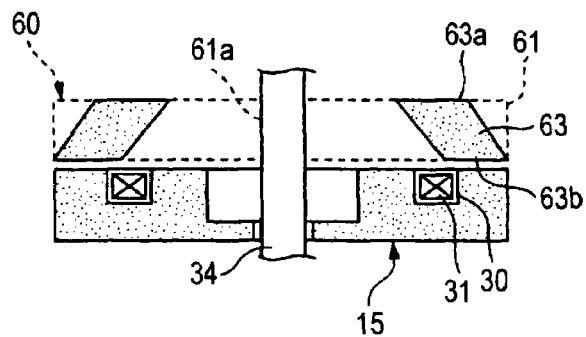
Figure 13:
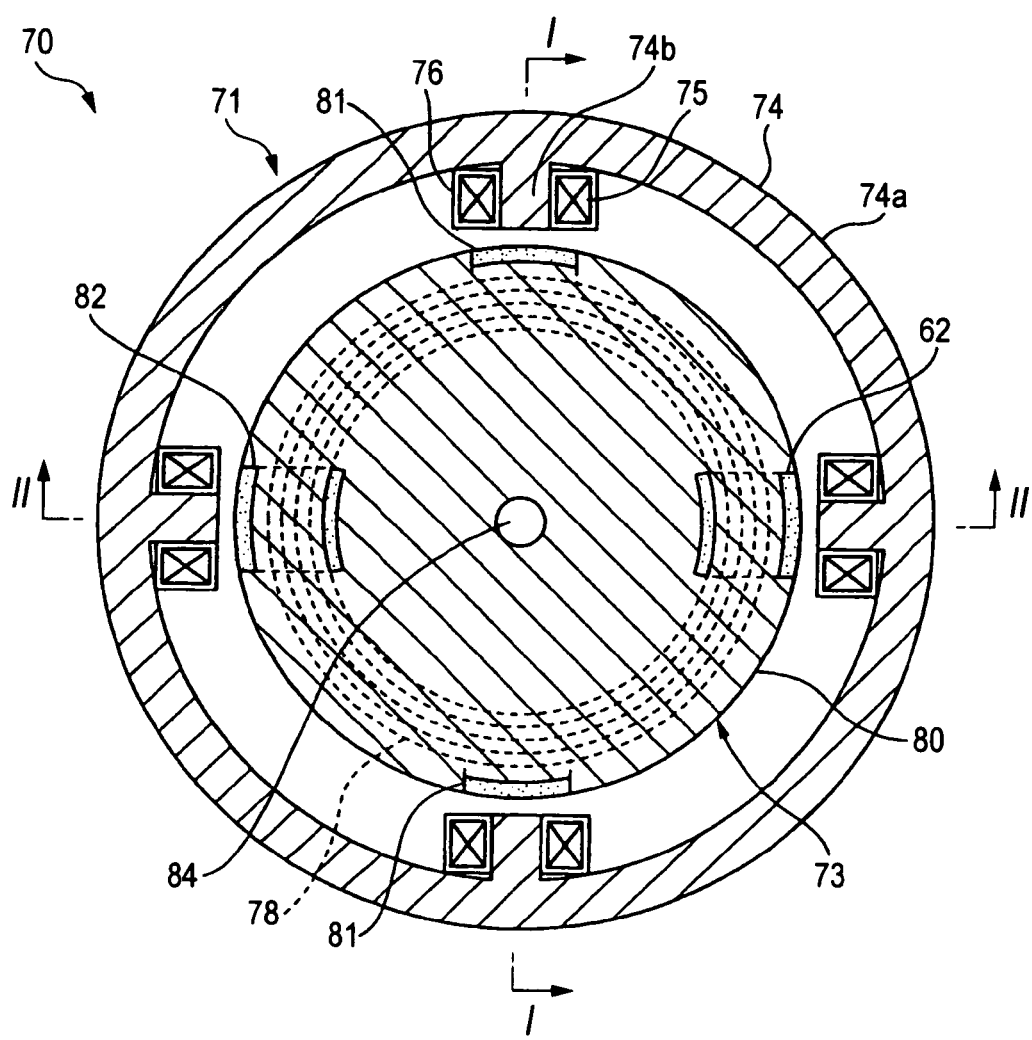
FIG. 13 is a sectional view of an inductor-type synchronous motor according to a fifth embodiment.

FIG. 12 shows a fourth embodiment.

The fourth embodiment differs from the first embodiment in that the number of N-pole inductors 62 and S-pole inductors 63 of a rotor 60 is increased.

A rotor 60 has a disk-shaped support portion 61 which is made of a non-magnetic material and is formed with a mounting hole 61*a*; for the rotating shaft, and six N-pole inductors 62 and six S-pole inductors 63 that are alternately disposed on along circumferential direction around the mounting hole 61*a* at regular intervals.

The other end surfaces 62*b* of the N-pole inductors 62 are disposed so as to face the outer circumferential side of the field coil 31 which is the N-pole generation position. The other end surfaces 63*b* of the S-pole inductors 63 are disposed so as to face the inner circumferential side of the field coil 31 which is the S-pole generation position. The end surfaces 62*a*, 63*a* of the N-pole inductors 62 and the S-pole inductors 63 which face the armature stator 13 are disposed on a concentric circle at regular intervals. A cross-section area of each of the N-pole inductors 62 and the S-pole inductors 63 is constant from the end surfaces 62*a*, 63*a* to the other end surfaces 62*b*, 63*b*. Also, the cross-section area of each of the N-pole inductors 62 and the cross-section area of each of the S-pole inductors 63 are substantially equal.

Since the other configurations are similar to those of the first embodiment, the description thereof is omitted.

FIGS. 13 to 16 show a fifth embodiment.

The fifth embodiment differs from the first embodiment in that it is directed to an inductor-type synchronous motor 70 of a radial gap structure.

An armature stator 71 includes a yoke 74 which is formed of a magnetic material and has four teeth portions 74*b* protruding from an inner circumferential surface of a cylindrical portion 74*a* at regular intervals along a circumferential direction, an annular heat-insulating refrigerant containers 76 each of which has a vacuum insulation structure and surrounds each of the teeth portions 74*b*, and armature coils 75 each of which is a winding made of a superconducting material and is accommodated inside the respective heat-insulating refrigerant containers 76.

The field stator 72 is fitted and fixed to the yoke 74 of the armature stator 71, and includes a disk-shaped yoke 77 formed of a magnetic body, a heat-insulating refrigerant container 79 having a vacuum insulation structure and is embedded in the yoke 77, and a field coil 78 which is a winding made of a superconducting material and is accommodated inside the heat-insulating refrigerant container 79. The yoke 77 has a loose-fitting hole 77a which is drilled at a center thereof to have an outer diameter of that is larger than the outer diameter of a rotating shaft 84, and a groove portion 77b which is concavely provided in an annular shape around the loose-fitting hole 77a. The field oil 78 is accommodated inside the heat-insulating refrigerant container 79 in which the liquid nitrogen is circulated. The heat-insulating refrigerant container 79 is embedded in the groove portion 77b.

A rotor 73 includes a disk-shaped support portion 80 which is made of a non-magnetic material and has a mounting hole 80a through which the rotating shaft 84 is mounted, a pair of N-pole inductors 81 embedded at point-symmetrical positions around the mounting hole 80a, and a pair of S-pole inductors 82 embedded at positions turned by 90° from the positions of the N-pole inductors 81.

Figure 14:
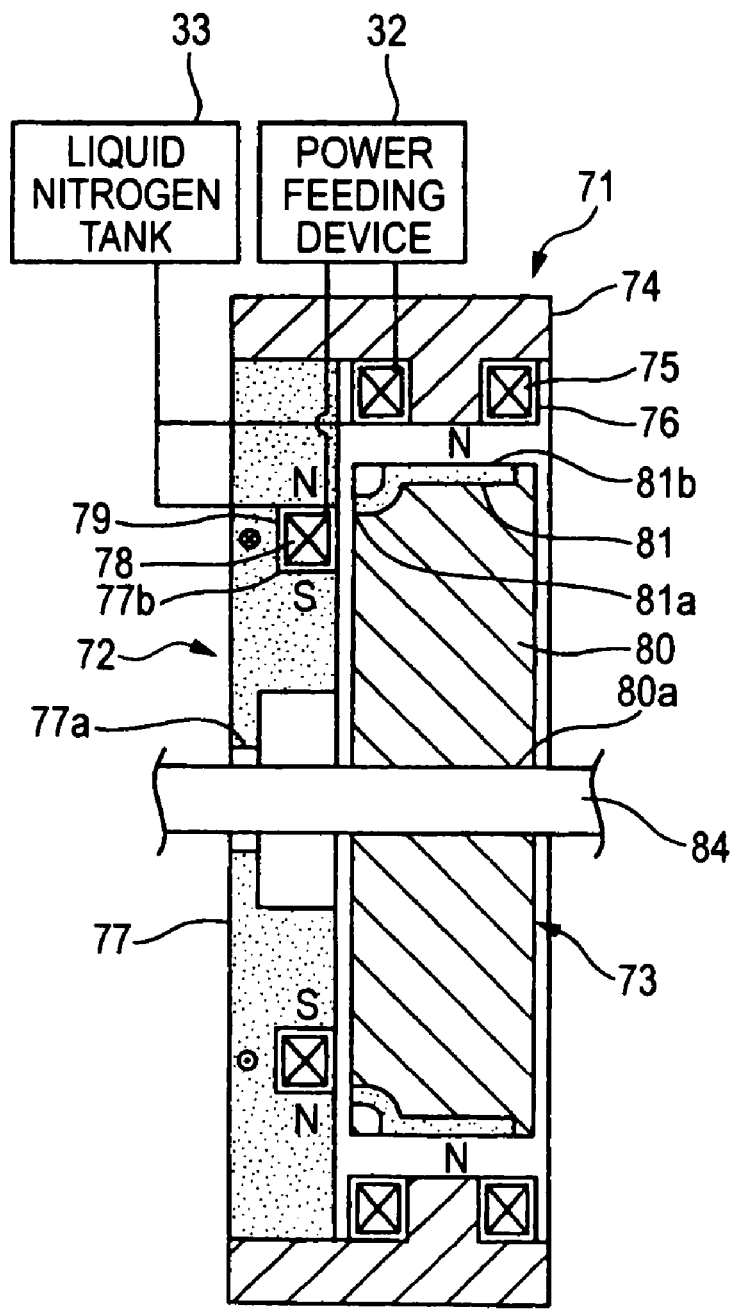
FIG. 14 is a sectional view taken along line I-I shown in FIG. 13.
Figure 16:
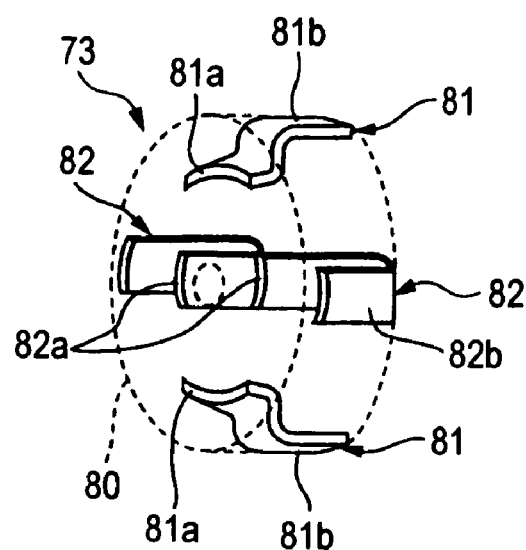
FIG. 16 is a perspective view of a rotor.

As shown in FIGS. 14 and 16, each of the N-pole inductors 81 has a stepped band-like shape, and one end 81a is disposed so as to face toward and along an N-pole generation position of the field coil 78 while an outer surface 81b on a side of the other end is disposed so as to face the armature coils 75.

Figure 15:
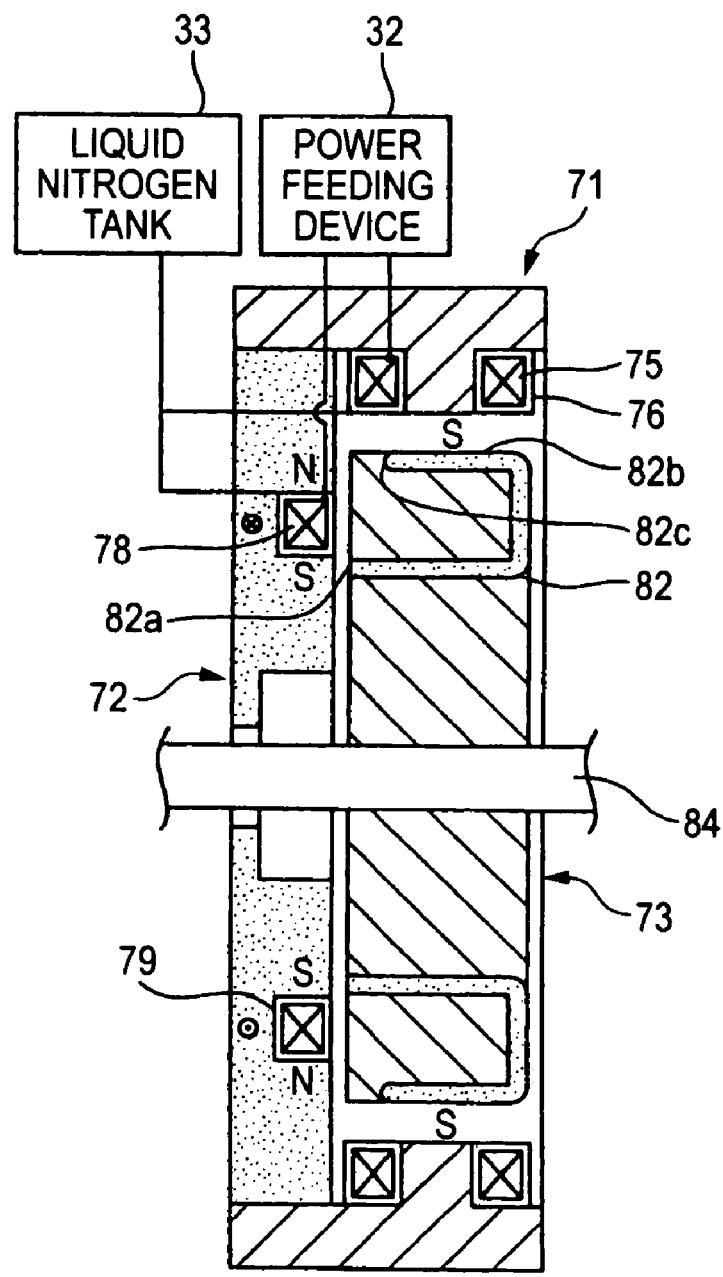
FIG. 15 is a sectional view taken along line II-II shown in FIG. 13.

As shown in FIGS. 15 and 16, each of the S-pole inductors 82 has a fold-back band-like shape, and one end 82a is disposed so as to face toward and along an S-pole generation position of the field coil 78 while an outer surface 82b on a side of the other end is disposed so as to face the armature coils 75. The other end 82c of the S-pole inductor 82 is not extended to an end surface of the rotor 73, and the S-pole inductor 82 is formed into a fold-back shape, thereby spacing it away form the N-pole of the field coil 78 so that a leakage of a magnetic flux is difficult to occur.

Cross-section area of each of the N-pole inductors 81 and the S-pole inductors 82 is constant, and the cross-section areas thereof are substantially equal to each other.

The yokes 74, 77, the N-pole inductors 81, and the S-pole inductors 82 are formed of a magnetic material such as permendur, a silicon steel plate, iron, and permalloy. The support portion 80 is formed of a non-magnetic material such as an FRP and stainless steel.

The power feeding device 32 is connected to the field coil 78 and the armature coils 75 through wiring. A direct current is supplied to the field coil 78 while a three-phase alternating current is supplied to the armature coils 75.

The liquid nitrogen tank 33 is connected to the heat-insulating refrigerant containers 76, 79 through insulation piping. The liquid nitrogen is thus circulated as a refrigerant.

Next, a principle of an operation of the inductor-type synchronous motor 70 will be described below.

When a direct current is supplied to the field coil 78, an N-pole is generated on the outer circumferential side of the field coil 78 while an S-pole is generated on the inner circumferential side thereof. Then, as shown in FIG. 14, a magnetic flux on a side of the N-pole is introduced into the N-pole inductor 81 from the other end surface 81a, whereby an N-pole magnetic flux appears on the outer surface 81b on the side of the other end. Further, as shown in FIG. 15, a magnetic flux on a side of the S-pole is introduced into the S-pole inductor 82 from the other end surface 82a, whereby an S-pole magnetic flux appears on the outer surface 82b on the other side.

When a three-phase alternating current is supplied to the armature coils 75 in this state, a rotating magnetic field is generated on the inner circumferential surface around an axis of the armature stator 71 due to a power feeding phase shift. The rotating magnetic field causes torque to be generated on the N-pole inductors 81 and the S-pole inductors 82 around the axis. Thus, the rotor 73 rotates to rotationally drive the rotating shaft 84.

Figure 17:
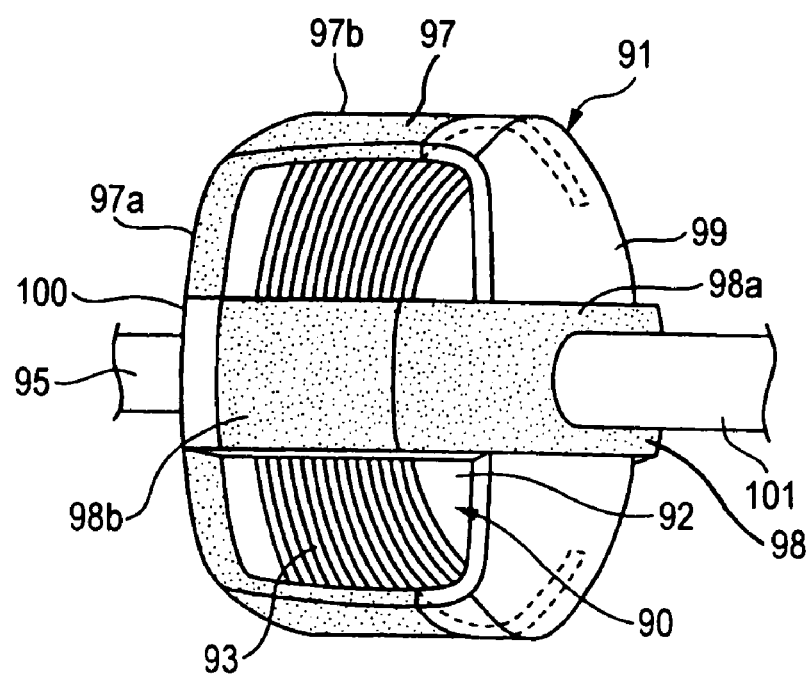
FIG. 17 is a perspective view of a rotor and a field stator according to a sixth embodiment.

FIG. 17 shows a sixth embodiment.

The sixth embodiment differs from the fifth embodiment in that the sixth embodiment has a structure in which a cylindrical field stator 90 is surrounded by a substantially tube-like rotor 91 with a gap being provided therebetween.

Since the armature stator 71 is similar to that of the fifth embodiment, the description thereof is omitted.

A field stator 90 has a cylindrical yoke 92 formed of a magnetic body, an annular vacuum insulation container 94 that is fitted and fixed to the outer circumference of the yoke 92, a field coil 93 formed of a superconducting material which is accommodated inside the heat-insulating refrigerant container 94 and is wound around the axis, and a fixed shaft 95 which laterally protrudes from the center of one of end surfaces of the yoke 92.

The rotor 91 includes an S-pole inductor 97 which is formed of a magnetic material to have a cross-section of a U shape and is disposed to cover a left side part of the field stator 90 at a position turned by 90°, an N-pole inductor 98 which is formed of a magnetic material to have a cross section of a U shape and is disposed to cover a right side part of the field stator 90, support portions 99, 100 which is formed of a non-magnetic material and connects the S-pole inductor 97 and the N-pole inductor 98 to be in one body, and a rotating shaft 101 which laterally protrudes from a center of the right side end surface of the rotor 91.

Figure 18:
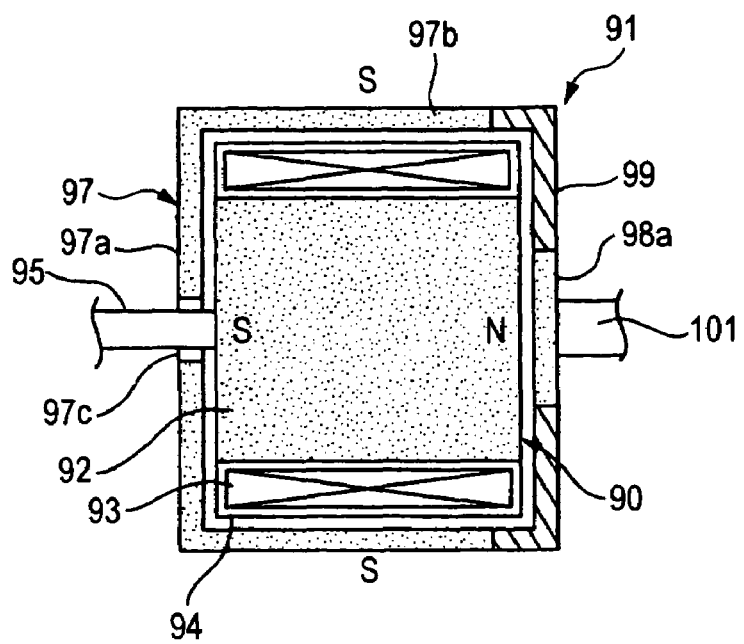
FIG. 18 is a sectional view of the rotor and the field stator.

As shown in FIG. 18, the S-pole inductor 97 is disposed such that a left side end surface 97a faces the S-pole generation position of the field coil 93, and such that an outer circumferential surface 97b faces the armature coils 75 of the armature stator 71. A loose-fitting hole 97c, whose diameter is larger than that of the fixed shaft 95, is drilled at a center of the left-side end surface 97a.

Figure 19:
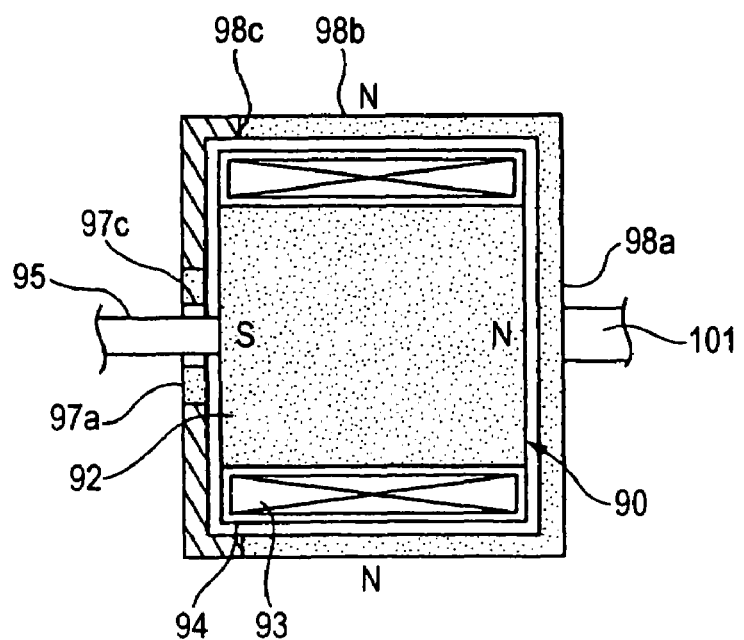
FIG. 19 is a sectional view seen from a position turned by 90° from FIG. 18.
Figure 20:
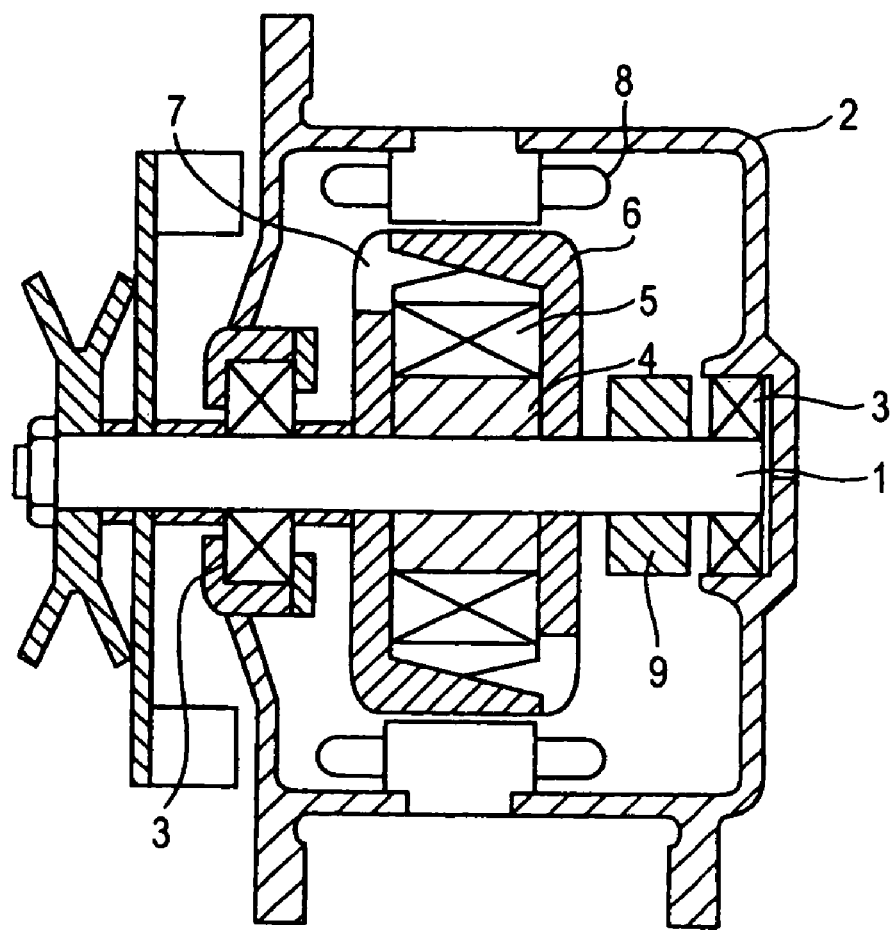
FIG. 20 is a view showing a conventional example.

As shown in FIG. 19, the N-pole inductor 98 is disposed such that a right-side end surface 98a faces the N-pole generation position of the field coil 93, and such that an outer circumferential surface 98b faces the armature coils 75. The rotating shaft 101 is fixed to a center of the right-side end surface 98a.

According to the above configuration, N-poles and S-poles alternately appear on the outer circumferential surface of the rotor 91a long a circumferential direction. Cross-section area of each of the S-pole inductor 97 and the N-pole inductor 98 is constant, and the cross-section areas of the S-pole inductor 97 and the N-pole inductor 97 are substantially equal to each other.

The yoke 92, the S-pole inductor 97, and the N-pole inductor 98 are formed of a magnetic material such as permendur, a silicon steel plate, iron, and permalloy. The support portions 99, 100 are formed of a non-magnetic material such as an FRP and stainless steel.

Next, a principle of an operation will be described below.

When a direct current is supplied to the field coil 93, an N-pole is generated on a right side and an S-pole is generated on a left side as viewed in the figure. Then, as shown in FIG. 18, a magnetic flux on a side of the S-pole is introduced into the S-pole inductor 97 from the left-side end surface 97a, so that an S-pole magnetic flux appears on the outer circumferential surface 97b. Further, as shown in FIG. 19, a magnetic flux on a side of the N-pole is introduced into the N-pole inductor 98 from the right-side end surface 98a, so that an N-pole magnetic flux appears on the outer circumferential surface 98b.

When a three-phase alternating current is supplied to armature coils 75 (not shown) in this state, a rotating magnetic field is generated on the inner circumferential surface around the axis the armature stator 71 due to a power feeding phase shift. The rotating magnetic field causes torque to be generated on the N-pole inductor 98 and the S-pole inductor 97 around the axis. Thus, the rotor 91 rotates to rotationally drive the rotating shaft 101.

The invention claimed is:

1. An inductor-type synchronous machine comprising:
   a field stator having a field element by which an N-pole and an S-pole are concentrically formed;
   a rotor having an N-pole inductor which is formed of a magnetic material and is disposed so as to face the N-pole of the field element, and an S-pole inductor which is formed of a magnetic material and is disposed so as to face the S-pole of the field element, wherein a rotating shaft is fixed to the rotor; and
   an armature stator having an armature coil which is disposed so as to face the N-pole inductor and the S-pole inductor.

2. The inductor-type synchronous machine according to claim 1, wherein the field element includes a field coil that is wound around an axis of the rotating shaft,
   wherein a part of the N-pole inductor is disposed so as to face one of an outer circumferential side and an inner circumferential side of the field coil, and a part of the S-inductor is disposed so as to face the other.

3. The inductor-type synchronous machine according to claim 1, wherein the field element includes a permanent magnet disposed around an axis of the rotating shaft,
   wherein a part of the N-pole inductor is disposed so as to face an N-pole side of the permanent magnet, and a part of the S-pole inductor is disposed so as to face an S-pole side of the permanent magnet.

4. The inductor-type synchronous machine according to claim 1, wherein at least one of the field element and the armature coil is formed of a superconducting material.

5. The inductor-type synchronous machine according to claim 1, wherein a cross-section area of each of the N-pole inductor and the S-pole inductor is constant from one end to the other end.

6. The inductor-type synchronous machine according to claim 5, wherein the cross-section area of the N-pole inductor and the cross-section area of the S-pole inductor are substantially equal.

7. The inductor-type synchronous machine according to claim 1, wherein the inductor-type synchronous machine has an axial-gap structure,
   wherein the field stator is disposed so as to face one side of the rotor in an axial direction of the rotor with a predetermined gap therebetween, and the armature stator is disposed so as to face the other side of the rotor in the axial direction of the rotor with a predetermined gap therebetween,
   the rotating shaft fixed to the rotor is rotatably passed through and bridged between the field stator and the armature stator, and
   a direction of a magnetic flux of each of the field element and the armature coils is directed to the axial direction.

8. The inductor-type synchronous machine according to claim 1, wherein the inductor-type synchronous machine has a radial-gap structure, wherein one of the field stator and the armature stator is an outer circumferential tube, and the rotor is disposed inside the outer circumferential tube with a predetermined gap therebetween.

* * * * *